United States Patent [19]
Hertel et al.

[11] 3,836,251
[45] Sept. 17, 1974

[54] ILLUMINATION SYSTEM FOR FILM RECORDING APPARATUS

[75] Inventors: Heinz E. Hertel, Mount Prospect; Robert L. Kearney, Northbrook; Paul E. Weber, Libertyville, all of Ill.

[73] Assignee: Bell & Howell Company, Chicago, Ill.

[22] Filed: Apr. 9, 1973

[21] Appl. No.: 349,494

[52] U.S. Cl.................. 355/70, 240/41.35, 355/11
[51] Int. Cl........................ G03b 27/54, G03b 27/70
[58] Field of Search........................ 355/11, 67–71; 240/41.35

[56] References Cited
UNITED STATES PATENTS
3,263,584  8/1966  Knus.................................. 355/67 X
3,498,715  3/1970  Gold.................................... 355/70
3,539,258  11/1970  Miles................................. 355/70

*Primary Examiner*—Richard A. Wintercorn
*Attorney, Agent, or Firm*—Robert A. Walsh; Gerald B. Epstein

[57] ABSTRACT

A microfilm apparatus including an illumination system having a long light path between a source of light and a document retaining exposure platen in a relatively compact structure. Only reflected, or indirect, light illuminates the exposure platen; all stray and direct light is absorbed by the unique baffle and light absorbing structure in the apparatus. To achieve compactness, the novel light path construction enables the distance between two light sources to be less than the width of the exposure platen.

7 Claims, 2 Drawing Figures

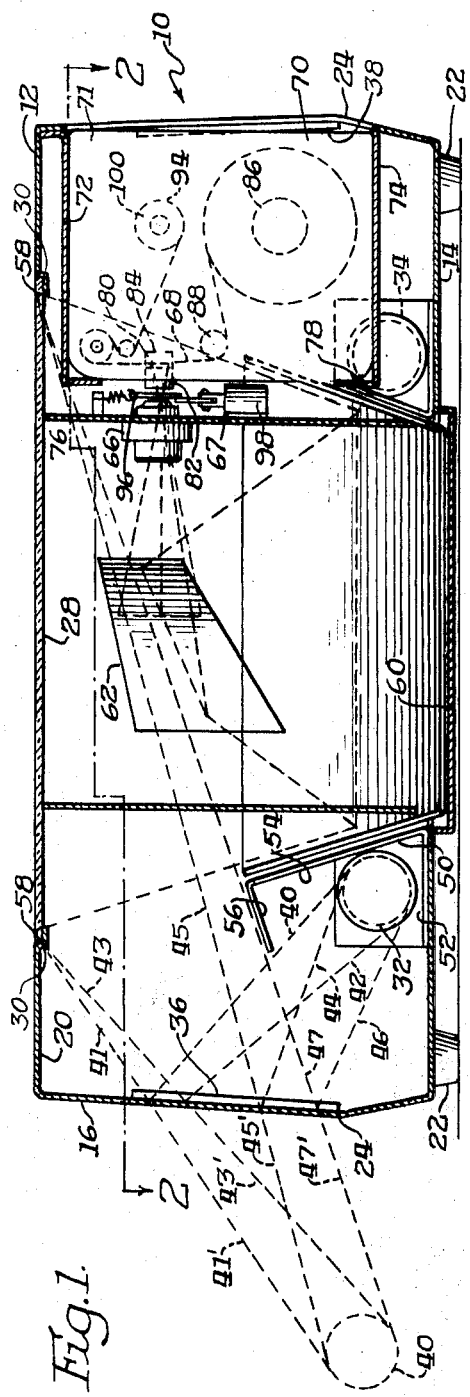

ILLUMINATION SYSTEM FOR FILM RECORDING APPARATUS

This invention realtes to an illumination system for a camera, and in particular to a novel light reflection and baffle system in a photographic recording camera for documents and the like, such as microfilm cameras.

Microfilm cameras are being extensively used by small as well as large organizations to photographically record important and valuable documents. The storage of a facsimile of these documents enables the elimination of elaborate file systems, freeing previously used document storage space for other productive purposes.

Present microfilming cameras are large, cumbersome, and expensive, often requiring specially trained personnel to operate and use the equipment. However, many smaller organizations cannot afford the time, expense, or manpower necessary to efficiently utilize present microfilming systems due to their relatively low volume of document storage work. These smaller organizations have been compelled to send their work to be microfilmed to outside contractors, or have these contractors bring in elaborate equipment to their facilities once a sufficient amount of documents has been accumulated.

The present invention has as a primary object the provision of an inexpensive, easy to operate, compact microfilm recording camera which will fill the needs of those organizations with minimal, but necessary, document recording requirements. The camera is so constructed and arranged that it can be operated by ordinary office personnel without specialized training, and its compact size enables it to be located and used in a small area, such as the corner of a standard office desk. Despite its compact size, the novel camera which is the subject of the present invention is capable of recording varied size documents. The camera is also adapted to operate in conjunction with a cartridge-type film supply which facilitates insertion and removal of the film and permits ease of development of the exposed film.

An additional object of the disclosed invention is to provide a microfilm apparatus having a long light path between a source of light and an exposure platen in a relatively small structure.

A further object of the present invention is to provide a microfilm apparatus having two sources of light and a document exposure platen, whereby the distance between each light source is less than the width of the exposure platen.

Still another object of the present invention is to provide a microfilm apparatus having an illumination system wherein indirect, reflected light is the sole means of illuminating a document platen.

A further object of the present invention is to provide a microfilm apparatus having an illumination system including a source of light and light reflection means, whereby all light not reflected from the reflection means is absorbed by background surfaces interior of the apparatus.

Still another object of the present invention is to provide a microfilm apparatus having an illumination system which includes a unique baffle system for absorbing all direct and stray light, and directing only reflected light to an exposure platen.

An additional object of the present invention is to provide an illumination system for the exposure platen of a microfilm apparatus whereby undesired light reflections and shadows are substantially reduced or eliminated.

While it has been stated that the primary purpose of this invention is to provide a compact, inexpensive microfilm recording camera, many of the features of the present invention are not limited to a microfilm camera or, in fact, a document recording system.

Other objects, features, and advantages of the present invention will be readily apparent from the following detailed description of a preferred embodiment thereof, taken in conjunction with the accompanying drawings in which:

FIG. 1 is a diagramatic, cut-away front section view of the microfilm apparatus of the present invention, illustrating the folded light track between the light source and the document platen, and the disposition of all reflecting surfaces in the illumination system, and FIG. 2 is a top plan view partially cut-away, of the microfilm apparatus of FIG. 1.

Referring to FIGS. 1 and 2, the microfilm camera encompassing the present invention is generally designated by the numeral 10, and includes a housing 12 having a base 14, side walls 16, 18, and an upper horizontal top wall 20. Legs 22 composed of rubber, plastic, or other suitable material, are fixed to the four corners of base 14 to support housing 12 on a desk, table or the like. Side walls 16, 18 extend outward from base 14 a short distance to a point 24 where they angle inwardly and meet top wall 20. This design of the side walls presents a pleasing design for housing 12, and enables the reflecting means to be properly located inside housing 12, as will be explained.

Top wall 20 is generally rectangular in shape, although its overall configuration is not particularly material to its performance in the presently disclosed invention. A portion of top wall 20 is cut-away, and a transparent glass or heat resistant plastic exposure platen 28 is inserted therein. To avoid secondary reflected images, a suitable non-reflective coating may be provided on the surface of the platen 28. Exposure platen 28 is adapted to receive a document or other article which is to be copied on microfilm in a reduced size. Angled brackets 30 are fixed to top wall 20 and retain exposure platen 28 in position such that the upper surface of the exposure platen is flush with the upper surface of top wall 20. Exposure platen 28 is generally rectangular in shape and is preferably larger than the normal legal size document. If necessary, exposure platen 28 may be larger if the camera 10 is to be used for recording larger size documents.

Disposed on either side of the lower portions of housing 12 are a pair of light sources comprising lamps 32, 34, such as display case lamps, by way of example. These lamps comprise the source of illumination for exposure platen 28, and in accordance with the preferred embodiment of the present invention, are spaced apart a distance which is less than the width of exposure platen 28, as best seen in FIG. 1. The novel light reflection and baffle system incorporated in the present invention enables the lamps to be disposed close together, even though the virtual image of each source of light extends beyond the boundaries of housing 12. As such, a smaller housing than normally used in microfilm cameras is provided by the present invention.

Fixed to the walls 16, 18 adjacent and slightly above lamps 32, 34 are reflecting means such as mirrors 36, 38 which direct light from lamps 32, 34 to exposure platen 28 along the light paths designated by the numerals 40 through 47. As indicated previously, side walls 18, 20 extend upward at a specified angle from the vertical. Mirrors 36, 38 are fixed to the inner surface of walls 16, 18 and the angle at which these walls extend locates the mirrors at the proper angle relative to lamps 32, 34 such that the reflected light illuminates the entire area of exposure platen 28. As will be explained in describing the light absorbing and baffling construction of the interior of housing 10, it will be appreciated that in the present invention, the reflected light from mirrors 36, 38 comprises the sole source of illumination for exposure platen 28. All direct light from the lamps, and all stray light, is absorbed by the interior of the camera apparatus.

Lamps 32, 34 and mirrors 36, 38 form a "folded light track" illumination source for exposure platen 28. Considering only the left side of the illumination system disclosed in FIG. 1, the real position of the light source is shown as lamp 32. The virtual image of this same light source is designated by the numeral 48, and the virtual light paths for illuminating exposure platen 28 are designated 41', 43', 45', and 47'. Image 48 indicates the required location of lamp 32 to illuminate exposure platen 28 were it not for the folded-light-track illumination system of the present invention, incorporating mirrors 36, 38 and the novel light absorbing and baffling structure associated therewith.

The light absorbing and baffling structure of the present invention ensures that no direct or stray light from lamps 32, 34 reaches exposure platen 28. This eliminates shadows and uneven illumination patterns on the exposure platen. To this end, illumination baffles 50 are provided adjacent lamps 32, 34 for absorbing a portion of the light eminating from the lamps. Each baffle 50 has a lower portion 52 which is fixed to base 14, and a portion 54 which extends upward and outward relative to base 14, partially over respective lamps 32, 34. An additional portion 56 of each baffle 50 extends downward and outward from the uppermost extent of portion 54, and extends over respective lamps 32, 34, as shown in FIG. 1.

The surface of each illuminating baffle 50 facing lamps 32, 34, as well as the interior surfaces of walls 14, 16, 18, and 20 are coated with a light absorbing substance, such as black paint, by way of example. Any light reaching these surfaces is absorbed and not reflected to exposure platen 28, thereby eliminating the possibility of stray light reaching the exposure platen.

Downward extending portions 56 of each baffle 50 serve a dual function. First, the portion 56 is positioned so that no light is able to reach exposure platen 28 directly from either lamp 32, 34. Second, the angle and extent of each portion 56 relative to mirrors 36, 38 is such that the lowermost reflected ray of light from mirrors 36, 38 which is designated by the numeral 47' in FIG. 1, reaches the furthest point on the width of exposure platen 28, as shown at point 58. All reflected light rays from mirrors 36, 38 falling below ray 47' are absorbed by the blackened interiors of illumination baffles 50. Therefore, downward extending portion 56 of each baffle 50 also functions as a light guide which prevents unnecessary reflected light from passing across the camera apparatus, which reduces the possibility of shadows in the film.

Light from exposure platen 28 is reflected onto a first relay mirror 60 which is preferrably trapozoidal in shape and disposed at a predetermined angle from the horizontal in the base of housing 10. The light is then reflected to a second relay mirror 62 which is fixed to the forward wall 64 of housing 12 at a predetermined angular position. From second relay mirror 62, the light is focused through a lens 66 fixed to interior wall 67 of housing 12 and then onto a segment of microfilm 68 disposed in a cartridge 70.

Mircofilm cartridge 70 is preferably a plastic container which slides removably through an opening 71 into a chamber formed in housing 12. The chamber is defined by upper wall 72 and lower wall 74 of housing 12. A downwardly extending flange 76 depending from upper wall 72, and an upwardly directed flange 78 fixed to lower wall 74 maintain cartridge 70 in position such that aperture block 80, which is fixed to lens 66, extends through exposure opening 82 in cartridge 70 and holds the microfilm 68 against fixed exposure station 84 with slight, but firm pressure. Light from lamps 32, 34 is reflected to lens 66 and passes through a central opening in aperture block 80. The light is then focused on sequential segments of film 68 opposite exposure opening 82, producing a latent image of the document to be recorded on the film. When the entire length of the film is exposed, the cartridge is removed from housing 12, and the film 68 is taken from the cartridge and developed. Alternatively, the cartridge may be removed from housing 12 prior to exposure of the entire length of film and inserted in a microfilm camera at another location at which documents are to be recorded on microfilm, while retaining the position of the film within the cartridge and retaining the focus setting with respect to the film plane. Similarly, if desired, different reduction ratios may be employed at the other locations while still utilizing the same film cartridge.

The film 68 is maintained in cartridge 70 on a supply spool 86 and is fed over an idler roller 88 past exposure station 84 to an idler roller 90. The film loops around a pin roller 92 and is fastened to take-up spool 94. Suitable drive means (not shown) are operably connected to the central shaft 100 of take-up spool 94 for driving the film past the exposure station at selected intervals, or at will, as desired by the operator.

The exposure of film 68 is controlled by a shutter 96 disposed between lens 66 and exposure station 84. Spring-loaded shutter 96 is selectively actuated by means of a solenoid 98, which moves the shutter to a position where it permits light to pass from lens 66 to film 68, whereby the film is exposed upon an operator generated signal.

To operate the apparatus comprising the present invention, suitable control means (not shown) are provided to activate lamps 32, 34, to actuate solenoid 98 for movement of shutter 96 to a position whereby light is permitted to pass through lens 66 to film 68, and to move film 68 sequentially forward in predetermined increments upon the exposure of each portion of the film. When lamps 32, 34 are turned on, reflected light from mirrors 36, 38 illuminates exposure platen 28. All light not reaching mirrors 36 or 38 is absorbed by the blackened interior surfaces of housing 12, and by baffle 50. A document to be recorded on microfilm is disposed on platen 28, and the light image from the document is transmitted to first relay mirror 60 and then to second relay mirror 62. Upon an operator generated signal, solenoid 98 is actuated, moving shutter 96 downward, permitting light from second relay mirror 62 to pass through lens 66 and exposure opening 82 to focus on a segment of film 68. Suitable operating means are connected to central shaft 100 of take-up spool 94 to incrementily drive film 68 past exposure station 84 for sequentially exposing film 68 to documents serially disposed on exposure platen 28.

Still other modifications to, and uses of, the present invention will readily occur to those skilled in the art. Therefore, the appended claims are to be construed to cover all equivalent structures falling within the scope and spirit of the invention.

We claim:

1. An illumination system for a film recording apparatus having a long light path from a source of light to a document retaining exposure platen in a relatively small structure comprising:
   a housing;
   reflecting means associated with said housing for reflecting a portion of light from said source to said exposure platen for illuminating said exposure platen, said portion of light from said reflecting means illuminates the complete width of said exposure platen;
   light absorbing means internal of said housing for absorbing all remaining light eminating from said source; and
   baffle means positioned relative to said light source to absorb additional light reflected from said reflecting means, which light is not directed to said exposure platen.

2. The illumination system of claim 1 wherein said light absorbing means includes surfaces interior of said housing coated with light absorbent materials selectively disposed throughout the interior portion of said apparatus.

3. The illumination system of claim 1 wherein the portion of light reflected from said reflecting means is the sole means of illuminating said exposure platen.

4. The illumination system of claim 1 wherein said baffle means includes an element extending between said light source and said exposure platen, a segment of said element being disposed in the path of a second portion of said light reflected by said reflecting means, which second portion of light is not reflected toward said exposure platen;
   said segment adapted to absorb said second portion of reflected light and to form a light guide for said portion of reflected light directed towards said exposure platen.

5. The illumination system of claim 1 wherein said reflecting means includes a mirror disposed on the interior surface of said apparatus.

6. An illumination system for a film recording apparatus having a long light path from a source of light to a document retaining exposure platen of predetermined length and width in a relatively small structure comprising:
   a housing;
   two light sources in said housing disposed lengthwise relative to said exposure platen at a fixed distance apart;
   said distance between said light sources being less than the width of said exposure platen;
   reflecting means associated with said housing and disposed adjacent of each of said light sources for reflecting a portion of light from each light source to said exposure platen, said portion from each light from said reflecting means illuminates the complete width of said exposure platen;
   light absorbing means internal of said housing for absorbing all remaining light eminating from said source; and
   baffle means positioned relative to said light source to absorb additional light reflected from said reflecting means, which light is not directed to said exposure platen.

7. The illumination system of claim 6 wherein the reflected light from said two sources is the sole means of illuminating said exposure platen.

* * * * *